United States Patent
Uchida et al.

(10) Patent No.: US 8,911,900 B2
(45) Date of Patent: Dec. 16, 2014

(54) BATTERY ELECTRODE PRODUCTION METHOD

(75) Inventors: Yozo Uchida, Toyota (JP); Nobuyuki Yamazaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 21 days.

(21) Appl. No.: 13/130,767

(22) PCT Filed: Apr. 12, 2010

(86) PCT No.: PCT/JP2010/056533
§ 371 (c)(1),
(2), (4) Date: May 24, 2011

(87) PCT Pub. No.: WO2011/128963
PCT Pub. Date: Oct. 20, 2011

(65) Prior Publication Data
US 2013/0022864 A1 Jan. 24, 2013

(51) Int. Cl.
*H01M 4/02* (2006.01)
*H01M 4/66* (2006.01)
*H01M 4/62* (2006.01)
*H01M 4/1391* (2010.01)
*H01M 4/70* (2006.01)
*H01M 4/36* (2006.01)
*H01M 4/04* (2006.01)

(52) U.S. Cl.
CPC ............... *H01M 4/70* (2013.01); *Y02E 60/122* (2013.01); *H01M 4/66* (2013.01); *H01M 4/621* (2013.01); *H01M 4/1391* (2013.01); *H01M 4/667* (2013.01); *H01M 4/366* (2013.01); *H01M 4/0404* (2013.01); *H01M 4/0473* (2013.01)
USPC .......................................... 429/211; 429/217

(58) Field of Classification Search
CPC ......... H01M 4/13; H01M 4/70; H01M 4/131; H01M 4/139; H01M 4/366; H01M 4/667
USPC ................... 429/233, 234, 239, 245, 211–217
See application file for complete search history.

(56) References Cited

U.S. PATENT DOCUMENTS

| 6,045,947 | A | 4/2000 | Shindo et al. | |
|---|---|---|---|---|
| 2003/0215716 | A1* | 11/2003 | Suzuki et al. | 429/232 |
| 2004/0072067 | A1* | 4/2004 | Minami et al. | 429/212 |
| 2005/0064291 | A1* | 3/2005 | Sato et al. | 429/233 |

(Continued)

FOREIGN PATENT DOCUMENTS

| JP | 8-329928 | 12/1996 |
|---|---|---|
| JP | 9-35707 | 2/1997 |

(Continued)

*Primary Examiner* — Milton I Cano
*Assistant Examiner* — Jimmy K Vo
(74) *Attorney, Agent, or Firm* — Finnegan, Henderson, Farabow, Garrett & Dunner, LLP

(57) ABSTRACT

A method is provided for producing a battery electrode having a configuration in which a compound material layer containing an active material and a binder is retained on a current collector. This method includes forming protrusions composed of a polymer on a surface of the current collector, forming a binder solution layer by coating a binder solution containing the binder over the polymer protrusions onto the current collector, depositing the binder solution layer and a compound material paste layer on the current collector by applying a compound material paste containing the active material over the binder solution layer, and obtaining an electrode in which the compound material layer is formed on the current collector by drying both the deposited binder solution layer and compound material paste layer.

10 Claims, 8 Drawing Sheets

(56) References Cited

U.S. PATENT DOCUMENTS

2006/0127773 A1 * 6/2006 Kawakami et al. .......... 429/245
2010/0273052 A1   10/2010 Sakitani et al.

FOREIGN PATENT DOCUMENTS

| | | |
|---|---|---|
| JP | 9-134718 | 5/1997 |
| JP | 9-185960 | 7/1997 |
| JP | 11-176423 | 7/1999 |
| JP | 2000-48805 | 2/2000 |
| JP | 3553244 | 5/2004 |
| JP | 2009-230976 | 10/2009 |
| JP | 2009-238488 | 10/2009 |
| JP | 2009-238720 | 10/2009 |
| JP | 2009-295474 | 12/2009 |

* cited by examiner

BATTERY ELECTRODE PRODUCTION METHOD

CROSS-REFERENCE TO RELATED APPLICATIONS

This application is a national phase application of International Application No. PCT/JP2010/056533, filed Apr. 12, 2010, the contents of which are incorporated herein by reference.

TECHNICAL FIELD

The present invention relates to a method for producing a battery electrode, and more particularly, to a method for producing a battery electrode having a configuration in which an electrode compound material layer containing an electrode active material is retained on a current collector.

BACKGROUND ART

Lithium ion batteries, nickel hydrogen batteries and other secondary batteries have recently become increasing important for use as vehicle-mounted power supplies or power supplies of personal computers and portable terminals. In particular, lithium secondary batteries, which are lightweight and provide high energy density, are expected to be preferably used as vehicle-mounted, high-output power supplies. In a typical configuration of this type of secondary battery, an electrode is provided that has a configuration in which a material capable of reversibly occluding and releasing lithium ions (electrode active material) is retained on an electrically conductive member (electrode current collector). Typical examples of electrode active materials used in negative electrodes (negative electrode active materials) include carbon-based materials such as graphite carbon or amorphous carbon. In addition, typical examples of electrode current collectors used in negative electrodes (negative electrode current collectors) include sheet-like and foil-like members consisting mainly of copper or copper alloy.

In the production of a negative electrode having such a configuration, a typical example of a method for retaining the negative electrode active material on the negative electrode current collector consists of coating a compound material paste, in which a negative electrode active material powder and a binder are dispersed in a suitable medium, onto the negative electrode current collector (such as copper foil) followed by drying by passing through a hot air dryer and the like to form a layer containing the negative electrode active material (negative electrode compound material layer). In this case, the binder in the negative electrode compound material layer fulfills the role of binding the negative electrode active materials as well as binding between the negative electrode compound material layer and the negative electrode current collector. In addition, the binder in the negative electrode compound material layer also fulfills the role of binding the negative electrode compound material layer to the negative electrode current collector. Patent Document 1 discloses examples of technical documents relating to this type of electrode production method.

Patent Document 1: Japanese Patent No. 3553244

DISCLOSURE OF THE INVENTION

However, in the production of a negative electrode as described above, when a compound material paste containing a negative electrode active material powder and a binder is coated onto a negative electrode current collector and dried, convection occurs during drying, and since binder in the vicinity of the current collector gathers (rises up) in the surface layer portion of the object coated with paste (opposite side of the current collector), the amount of the binder in the vicinity of the current collector decreases, thereby resulting in the problem of a decrease in adhesive strength (adhesion) between the negative electrode current collector and the negative electrode compound material layer. If the adhesive strength between the negative electrode current collector and the negative electrode compound material layer decreases, since the negative electrode compound material layer lifts off or peels from the negative electrode current collector in subsequent production steps (such as a step of winding a negative electrode sheet and positive electrode sheet in the form of a spiral) or during use of the battery, this can cause a decrease in battery performance. With the foregoing in view, the primary object of the present invention is to provide a battery electrode production method that is able to enhance adhesive strength (adhesion) between a current collector and a compound material layer.

According to the present invention, a method for producing a battery electrode having a configuration in which a compound material layer containing an active material and a binder is retained on a current collector. The compound material layer is formed by coating a compound material paste containing the active material onto the current collector followed by drying.

Here, formation of the compound material layer includes a step of forming protrusions composed of a polymer on a surface of the current collector. In addition, it also includes a step of forming a binder solution layer by coating a binder solution containing the binder over the polymer protrusions onto the current collector. In addition, it also includes a step of depositing the binder solution layer and a compound material paste layer on the current collector by coating a compound material paste containing the active material over the binder solution layer. Moreover, it also includes a step of obtaining an electrode in which the compound material layer is formed on the current collector by drying both the deposited binder solution layer and compound material paste layer.

According to the method of the present invention, since the compound material paste layer is formed by forming the binder solution layer between the current collector and the compound material paste layer and then drying the binder solution layer and the compound material paste layer, a large amount of binder derived from the binder solution layer is arranged at the interface between the current collector and the compound material layer. As a result, the amount of binder in the vicinity of the current collector increases and an electrode is obtained that is provided with a compound material layer having favorable adhesion (adhesive strength) with the current collector.

In addition, since protrusions composed of a polymer that act as slippage preventers are formed on the surface of the current collector, slippage of the composite material paste layer can be prevented. Namely, when the compound material paste is applied over the binder solution layer, although the compound material paste is struck by the binder solution layer possibly resulting in the occurrence of slippage and the formation of surface irregularities in the surface (coated surface) of the compound material layer obtained after drying, according to the present invention, since the polymer protrusions are formed on the surface of the current collector, and the binder solution layer and the compound material paste layer are sequentially deposited thereon, the compound material paste layer catches on the polymer protrusions. As a result, slippage of the compound material paste layer is prevented, and an electrode can be produced that is provided with a compound material layer having favorable flatness and few surface irregularities on the surface thereof.

The height of the polymer protrusions is preferably larger than the thickness of the binder solution layer. In this case, since the distal ends of the polymer protrusions protrude above the upper surface of the binder solution layer, slippage of the compound material paste layer can be suitably inhibited.

Preferably, the height of the polymer protrusions is larger than a total combined thickness of the thickness of the binder solution layer and the thickness of the compound material paste layer. In this case, since the distal ends of the polymer protrusions protrude above the upper surface of the compound material paste layer, slippage of the compound material paste layer can be more reliably inhibited.

In a preferable aspect of the production method disclosed herein, the polymer protrusions are formed in the form of a plurality of independent dots (punctate pattern). In this case, slippage of the compound material paste layer can be suitably inhibited by protrusions in the form of a large number of independent dots.

In a preferable aspect of the production method disclosed herein, the polymer protrusions are formed in the form of patterned projections. In this case, slippage of the compound material paste layer can be suitably inhibited by protrusions in the form of patterned surface irregularities.

In a preferable aspect of the production method disclosed herein, the polymer protrusions are formed by coating a polymer solution containing a polymer onto the current collector followed by drying. In this case, the polymer protrusions can be formed easily. For example, polymer protrusions in the form of dots can be easily formed by coating the polymer solution by spraying. In addition, polymer protrusions in the form of patterned projections can be formed easily by coating the polymer solution by printing (such as inkjet printing, relief printing, gravure printing or screen printing).

In a preferable aspect of the production method disclosed herein, static electricity is applied to a coating of the polymer solution. In this case, the drying rate of the coating of the polymer solution is accelerated by energy of the static electricity. Consequently, the polymer protrusions can be formed efficiently (and preferably without the use of a drying oven).

In a preferable aspect of the production method disclosed herein, the polymer protrusions function as a binder in the compound material layer. In this case, since the polymer protrusions function as a binder, adhesion between the compound material layer and the current collector can be further enhanced. In this case, the polymer protrusions can be made of the same material (common polymer) as the binder contained in the binder solution.

According to the present invention, a battery (for example, a lithium secondary battery) is also provided by using an electrode obtained according to any of the methods disclosed herein. Since this battery is composed by using the above-mentioned electrode for at least one of the electrodes, it demonstrates superior battery performance. For example, as a result of constructing a battery using the above-mentioned electrode, a battery can be provided that satisfies at least one (and preferably all) of high cycle durability, superior output characteristics and favorable productivity.

This type of battery is preferable for use as a battery installed in a vehicle such as an automobile. Thus, according to the present invention, a vehicle is provided that is equipped with any of the batteries disclosed herein (which may be in the form of a battery assembly in which a plurality of batteries are interconnected). In particular, the battery is preferably a lithium secondary battery (and typically, a lithium ion battery) since it is lightweight and allows the obtaining of a high output, and the vehicle (and typically, an automobile) is preferably provided with the lithium secondary battery as a motive power supply (and typically, a motive power supply of a hybrid vehicle or electric vehicle).

BEST MODE FOR CARRYING OUT THE INVENTION

Figure 1:
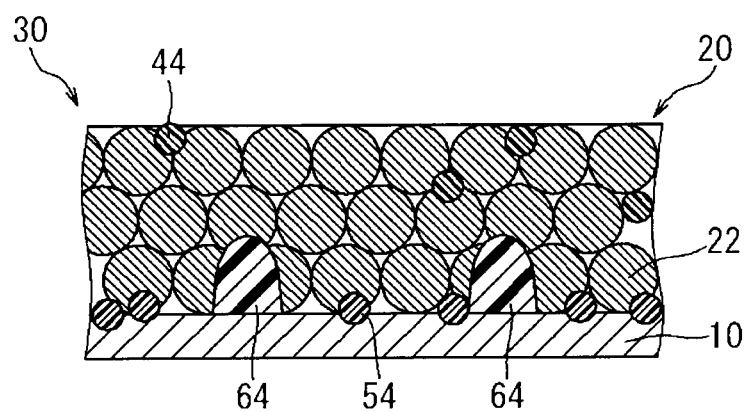
FIG. 1 is a cross-sectional view schematically showing an electrode relating to an embodiment of the present invention.

The following provides an explanation of embodiments according to the present invention while referring to the drawings. In the following drawings, those members and sites demonstrating the same actions are explained using the same reference symbols. Furthermore, the dimensional relationships in each drawing (such as length, width and thickness) do not reflect actual dimensional relationships. In addition, matters other than those specifically mentioned in the present description that are required for carrying out the present invention (such as the configuration and production method of an electrode body provided with a positive electrode and negative electrode, the configuration and production method of a separator and electrolyte, batteries, or other general technical matters relating to battery construction) can be understood to be design matters for a person with ordinary skill in the art based on the prior art in the relevant field.

As shown in FIG. 1, the electrode production method disclosed herein is a production method of an electrode 30 having a configuration in which a compound material layer 20, containing an active material 22 and a first binder 54, is retained on a current collector 10. This compound material layer 20 is formed by coating a compound material paste containing the active material 22 onto the current collector 10 followed by drying.

Figure 2:
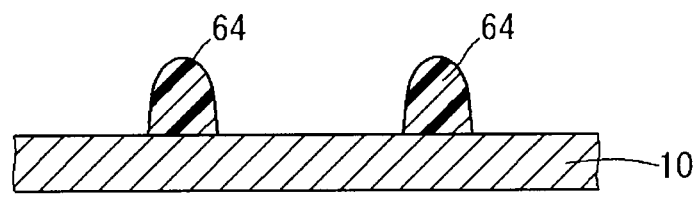
FIG. 2 is cross-sectional view schematically showing the production process of an electrode relating to an embodiment of the present invention.
Figure 3:
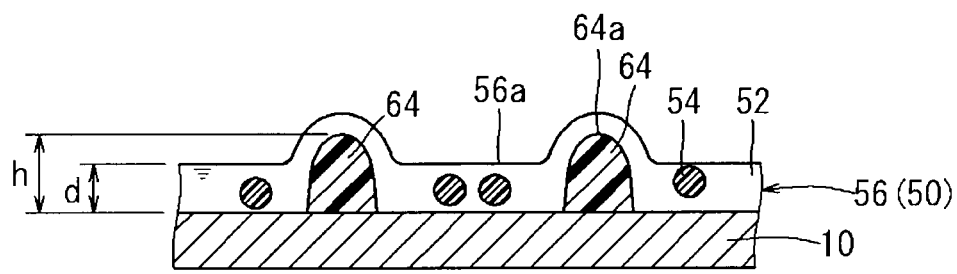
FIG. 3 is cross-sectional view schematically showing the production process of an electrode relating to an embodiment of the present invention.
Figure 4:
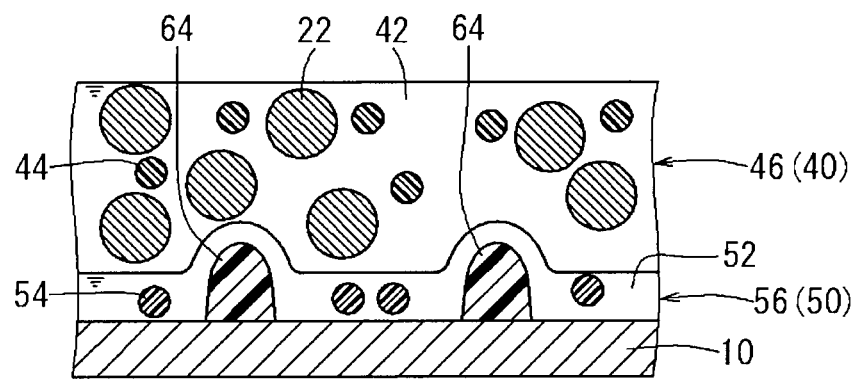
FIG. 4 is cross-sectional view schematically showing the production process of an electrode relating to an embodiment of the present invention.
Figure 5:
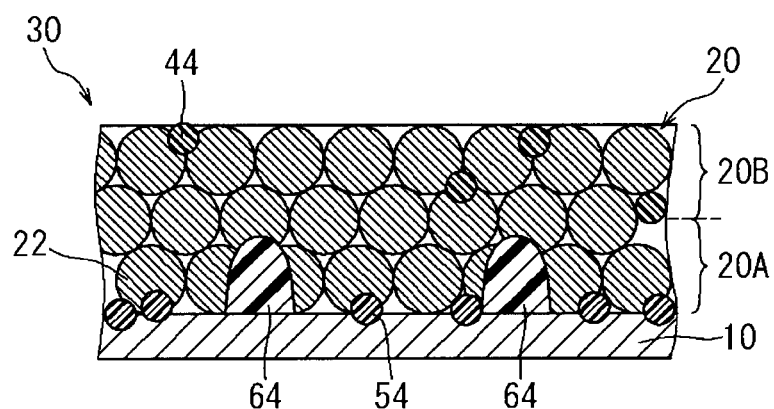
FIG. 5 is cross-sectional view schematically showing the production process of an electrode relating to an embodiment of the present invention.

In the electrode production method of the present embodiment, as shown in FIG. 2, protrusions 64 composed of a polymer are first formed on the surface of the current collector 10. Next, as shown in FIG. 3, a binder solution layer 56 is formed by coating a binder solution 50 containing a binder (a first binder) 54 over the polymer protrusions 64 onto the current collector 10. Then, as shown in FIG. 4, the binder solution layer 56 and a compound material paste layer 46 are deposited on the current collector 10 by coating the compound material paste 40 containing the active material 22 over the binder solution layer 56. As shown in FIG. 5, the electrode 30 is obtained in which the compound material layer 20 is formed on the current collector 10 by drying both the deposited binder solution layer 56 and compound material paste layer 46.

According to the production method relating to the present embodiment, as shown in FIG. 4, since the binder solution layer 56 is formed between the current collector 10 and the compound material paste layer 46, and the compound material layer 20 is formed by drying both the binder solution layer 56 and the compound material paste layer 46, a large amount of the first binder 54 derived from the binder solution layer 56 is arranged at the interface between the current collector 10 and the compound material layer 20. As a result, there is a large amount of binder in the vicinity of the current collector 10, and the electrode 30 is obtained that is provided with the compound material layer 20 having favorable adhesion (adhesive strength) with the current collector 10.

In addition, since the protrusions 64 composed of a polymer that act as slippage preventers are formed on the surface of the current collector 10, slippage of the compound material paste layer 46 can be prevented. Namely, when the compound material paste 40 is applied over the binder solution layer 56, although the compound material paste 40 is struck by the binder solution layer 56 possibly resulting in the occurrence of slippage and the formation of surface irregularities in the surface of the compound material layer 20 obtained after drying, according to the present embodiment, since the polymer protrusions 64 are first formed on the surface of the current collector 10 followed by sequentially depositing the binder solution layer 56 and the compound material paste layer 46, the compound material paste layer 46 catches on the polymer protrusions 64. As a result, slippage of the compound material paste layer 46 is prevented, and the electrode 30 can be produced that is provided with the compound material layer 20 having favorable flatness and few surface irregularities on the surface thereof.

As shown in FIG. 3, a height (h) of the polymer protrusions is preferably larger than a thickness (d) of the binder solution layer 56. In this case, since the distal ends 64*a* of the polymer protrusions protrude above the upper surface 56*a* of the binder solution layer, slippage of the compound material paste layer 46 can be suitably inhibited. Preferably, the height of the polymer protrusions 64 is larger than the total combined thickness of the thickness of the binder solution layer 56 and the thickness of the compound material paste layer 46. In this case, since the distal ends 64*a* of the polymer protrusions protrude above the upper surface of the compound material paste layer 46, slippage of the compound material paste layer 46 can be more reliably inhibited. As an example thereof, in the case the thickness of the binder solution layer 56 is roughly 2 μm and the thickness of the compound material paste layer 46 is roughly 45 μm, then the height of the polymer protrusions is preferably 2 to 45 μm or more, and more preferably, for example, 47 μm or more.

The polymer protrusions are preferably provided on the surface of the current collector 10 at least within the range (region) over which the compound material paste 40 is applied. For example, an aspect in which the polymer protrusions are provided within the range over which the compound material paste 40 is applied to one side in the case the compound material paste 40 is applied to only one side of the current collector 10 (either over only a portion of one side or over the entire one side), or an aspect in which the polymer protrusions are provided within the range over which the compound material paste 40 is applied to both sides of the current collector 10 in the case the compound material paste 40 is applied to both sides thereof, can be preferably employed.

In a preferable aspect disclosed herein, the polymer protrusions are formed in the form of a plurality of independent dots (punctate pattern). In this case, slippage of the compound material paste layer 46 can be suitably inhibited by protrusions in the form of a large number of independent dots. Although there are no particular limitations on the dimensions of the dots, the diameter thereof is, for example, about 10 to 100 μm. These dot-like protrusions are preferably formed so that they are distributed at 5000 dots/cm$^2$ to 15000 dots/cm$^2$ per unit surface area of the current collector.

Figure 6:
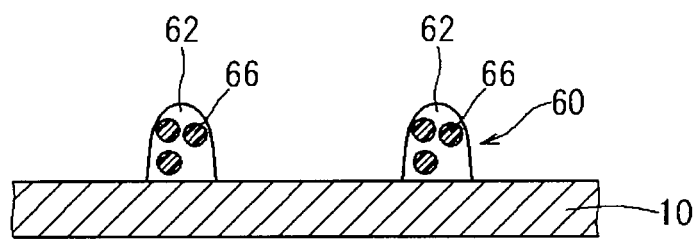
FIG. 6 is cross-sectional view schematically showing the production process of an electrode relating to an embodiment of the present invention.

As shown in FIG. 6, the polymer protrusions can be formed by coating a polymer solution 60 containing a polymer 66 onto the current collector 10 followed by drying. For example, dot-like polymer protrusions can be formed by coating the polymer solution 60 of the polymer 66 onto the current collector 10 by spraying followed by drying.

Although there are no particular limitations on the polymer that composes the polymer protrusions provided it is an adhesive polymer capable of adhering to the surface of the current collector, it is preferably that which functions as a binder in the compound material layer. For example, the polymer protrusions are preferably made of the same material as the binder used in a typical lithium secondary battery electrode. In this case, since the polymer protrusions 64 function as a binder in the compound material layer, adhesion between the compound material layer 20 and the current collector 10 can be further enhanced. In this case, the polymer that composes the polymer protrusions and the binder contained in the binder solution can be made of the same material.

More specifically, examples of polymers that compose the polymer protrusions include water-soluble or water-dispersible polymers used such as styrene butadiene rubber (SBR), carboxymethyl cellulose (CMC), polytetrafluoroethylene (PTFE), polyethylene (PE) or polyacrylic acid (PAA). Alternatively, other examples include organic solvent-based polymers such as polyvinylidene fluoride (PVDF) or polyvinylidene fluoride-hexafluoropropylene (PVDF-HFP).

A solvent 62 that composes the polymer solution is that which is able to disperse or dissolve the polymer. For example, in the case of using a water-soluble or water-dispersible polymer, water or a mixed solvent composed mainly of water is used preferably for the solvent 62. One type or two or more types of an organic solvent capable of uniformly mixing with water (such as a lower alcohol or lower ketone) can be suitably selected and used as a solvent component other than water that composes the mixed solvent. For example, an aqueous solvent in which 80% by weight or more (and more preferably 90% by weight or more, and even more preferably 95% by weight or more) of the aqueous solvent is water is preferable. An aqueous solvent substantially composed of water is particularly preferable. In addition, in the case of using an organic solvent-based polymer, a non-aqueous solvent (organic solvent) is used preferably. N-methylpyrrolidone (NMP), for example, can be used for this non-aqueous solvent.

The polymer concentration (solid concentration) in the polymer solution is suitably roughly 5 to 35% by weight, and preferably roughly 10 to 20% by weight. If the polymer concentration is excessively high, coatability of the polymer solution becomes poor, while if the polymer concentration is excessively low, the drying rate becomes slow which may cause a decrease in productivity.

The procedure for coating this polymer solution 60 onto the current collector 10 can be easily carried out using a typical fluid coating technology, examples of which include printing methods (such as inkjet printing, relief printing, gravure printing or screen printing) and spraying. For example, a dot-like coating (liquid droplets) can be formed by spraying a prescribed amount of the polymer solution onto the surface of the current collector 10 using a suitable spraying apparatuses (such as a spray gun).

Following the coating as described above, the solvent 62 in the polymer solution is removed by drying the coating using a suitable drying means (and typically at 70 to 160° C.). As shown in FIG. 2, removing the solvent 62 from the polymer solution allows the obtaining of the current collector 10 in which the polymer protrusions 64 are formed on the surface of the current collector 10.

Furthermore, static electricity is preferably applied to the coating of the polymer solution (liquid droplets) prior to drying. In this case, the drying rate of the coating of the polymer solution (liquid droplets) is accelerated by the energy of this static electricity. Consequently, the polymer protrusions 64 can be formed efficiently (and preferably without using a drying oven). Although there are no particular limitations on the method used to apply static electricity to the coating of the polymer solution (liquid droplets), an example of a method consists of applying a voltage (high-frequency voltage) to the polymer 66 mixed into the polymer solution. Mixing a polymer to which a voltage has been applied in this manner into the polymer solution enables static electricity to be efficiently applied to the coating of the polymer solution (liquid droplets). Although the magnitude of the voltage applied varies according to polymer selected, composition of the polymer solution, coating conditions and the like, it is suitably roughly 5 kV·μA or more and preferably normally 40 kV·μA or more (for example, within the range of 40 to 200 kV·μA).

Once the current collector 10 has been obtained in which the polymer protrusions 64 have been formed on the surface of the current collector 10 in this manner, the binder solution layer 56 is next formed by applying the binder solution 50 containing the binder 54 over the polymer protrusions 64 on the current collector 10 as shown in FIG. 3.

An aqueous solvent is a preferable example of the solvent 52 used in the binder solution. Water or a mixed solvent composed mainly of water is preferably used for the aqueous solvent. One type or two or more types of an organic solvent capable of uniformly mixing with water (such as a lower alcohol or lower ketone) can be suitably selected and used as a solvent component other than water that composes the mixed solvent. For example, an aqueous solvent in which 50% by weight or more (and more preferably 80% by weight or more, and even more preferably 90% by weight or more) of the aqueous solvent is water is used preferably. An aqueous solvent substantially composed of water is a particularly preferable example. Furthermore, the binder solution is not limited to an aqueous solvent, but rather may also be a non-aqueous solvent (an organic solvent composed mainly of a binder dispersion medium). N-methylpyrrolidone (NMP), for example, can be used for this non-aqueous solvent.

There are no particular limitations on the binder (first binder) 54 used in the binder solution provided it is the same as that used for a typical lithium secondary battery electrode. For example, in the case of forming the binder solution layer using an aqueous solvent (solvent in which water or a mixed solvent having water as a main component thereof is used as a binder dispersion medium), a polymer that disperses or dissolves in water can be preferably employed for the binder. Examples of polymers that disperse or dissolve in water include styrene butadiene rubber (SBR), carboxymethyl cellulose (CMC), polytetrafluoroethylene (PTFE), polyethylene (PE) and polyacrylic acid (PAA). Alternatively, in the case of forming the binder solution layer using a solvent-based solvent (solvent consisting of an organic solvent composed mainly of a binder dispersion medium), a polymer that disperses or dissolved in the solvent-based solvent can be used. Examples of polymers that disperse or dissolve in a solvent-based solvent include polyvinylidene fluoride (PVDF) and polyvinylidene fluoride-hexafluoropropylene (PVDF-HFP).

The procedure for coating this polymer solution onto the current collector can be carried out using a typical fluid coating technology, examples of which include printing methods (such as inkjet printing, relief printing, gravure printing or screen printing), dispenser coating, spray coating and nanowire coating. A method consisting of coating the binder solution onto the current collector using a dispenser is an example of a method for coating the binder solution onto the current collector in the technology disclosed herein. As a result, the binder solution layer 56 can be formed to have uniform thickness. Although there are no particular limitations on the thickness of the binder solution layer, it is normally 1.5 to 6 μm, and suitably, for example, about 2 to 4 μm.

Although there are no particular limitations on the coated amount of the binder solution (coated amount per unit surface area), if the coated amount of the binder solution is excessively low, the amount of binder in the binder solution layer becomes excessively low, which may prevent obtaining of the effect of enhancing adhesive strength between the current collector and the compound material layer. On the other hand, if the coated amount of the binder solution is excessively high, the amount of binder in the binder solution layer becomes excessively high, which may increase the interface resistance between the current collector and the compound material layer. Thus, the coated amount of the binder solution as the solid content thereof (namely, as the weight of the binder after drying) is roughly about 0.01 to 0.05 mg/cm$^2$ and normally preferably 0.02 to 0.03 mg/cm$^2$.

Once the binder solution layer 56 has been formed in this manner, the binder solution layer 56 and the compound material paste layer 46 are then deposited on the current collector 10 by coating the compound material paste 40 over the binder solution layer 56 as shown in FIG. 4.

The above compound material paste can be prepared by mixing the active material (and typically, a powdered form thereof) 22 with another compound material layer forming component (such as the binder 44) used as necessary in a suitable solvent 42.

There are no particular limitations on the active material (and typically, a powdered form thereof) 22, and it may be the same as that used in a typical lithium ion secondary battery. Typical examples of the negative electrode active material 22 used for the negative electrode include carbon-based materials such as graphite carbon or amorphous carbon, lithium transition metal composite oxides (such as lithium titanium composite oxides), and lithium transition metal composite nitrides.

In addition to the active material 22, the compound material paste can contain as necessary a material used in compound material pastes for forming a compound material layer in the production of an ordinary electrode. Typical examples of such materials include electrical conductive materials and the binder (second binder) 44. Examples of electrically conductive materials that can be used include carbon powder such as carbon black (including acetylene black) and electrically conductive metal powders such as nickel powder. The binder 44 fulfills the role of binding active material particles together. This binder 44 may be the same material as the binder 54 contained in the binder solution layer 56 or a different material.

Preferable examples of the solvent 42 used for the above compound material paste include water and mixed solvents composed mainly of water (aqueous solvents). One type or two or more types of organic solvents able to uniformly mix with water (such as lower alcohols or lower ketones) can be suitably selected and used for the solvent other than water that composes this mixed solvent. The solvent 42 is not limited to an aqueous solvent, but rather may also be a non-aqueous solvent. An example of a non-aqueous solvent that can be used is N-methylpyrrolidone (NMP).

The procedure for coating the compound material paste 40 onto the current collector 10 can be carried out in the same manner as production of an electrode for an ordinary lithium secondary battery of the prior art with the exception of using a current collector in which the polymer protrusions 64 and the binder solution layer 56 are formed on the surface thereof as the current collector as previously described. For example, the compound material paste layer 46 can be formed by coating a prescribed amount of the compound material paste 40 onto the current collector 10 over the binder solution layer 56 using a suitable coating apparatus (such as a die coater).

Here, when the compound material paste 40 is applied over the binder solution layer 56, although the compound material paste 40 is struck by the binder solution layer 56 possibly resulting in the occurrence of slippage and the formation of surface irregularities in the surface of the compound material layer 46, according to the present embodiment, since the polymer protrusions 64 are formed on the surface of the current collector 10, and the binder solution layer 56 and the compound material paste layer 46 are sequentially deposited thereon, the compound material paste layer 46 catches on the polymer protrusions 64. As a result, slippage of the compound material paste layer 46 is prevented and the application described above can be carried out stably.

Once the binder solution layer 56 and the compound material paste layer 46 have been deposited on the current collector 10 in this manner, as shown in FIG. 5, the electrode 30, in which the compound material layer 20 is formed on the current collector 10, is then obtained by drying both the deposited binder solution layer 56 and compound material paste layer 46.

The drying temperature is within a temperature range that enables the solvent 52 of the binder solution layer and the solvent 42 of the compound material paste layer to be volatilized. For example, in the case of using water for the solvent of the binder solution layer and the compound material paste layer, the drying temperature can be roughly about 70 to 160° C., and is preferably normally 80 to 150° C.

Production of the electrode 30 relating to the present embodiment is completed in this manner. Furthermore, the thickness and density of the compound material layer 20 can be adjusted by carrying out suitable press processing (such as roll press processing) as necessary after drying the compound material paste 40.

The cross-sectional structure of the electrode 30 for a lithium secondary battery preferably produced by applying the electrode production method disclosed herein is schematically shown in FIG. 5. The electrode 30 has a configuration in which the compound material layer 20 containing an active material 22 is retained on the current collector 10. As shown in FIG. 4, this compound material layer 20 is formed by forming the polymer protrusions 64 on the surface of the current collector and sequentially depositing the binder solution layer 56 and the compound material paste layer 46 thereon, followed by drying both the binder solution layer 56 and the compound material paste layer 46.

According to the present embodiment, since the compound material layer 20 is formed by forming the binder solution layer 56 between the current collector 10 and the compound material paste layer 46 and drying both the binder solution layer 56 and the compound material paste layer 46, a large amount of the binder 54 derived from the binder solution layer 56 is arranged at the interface between the current collector 10 and the compound material layer 20. As a result, there is a large amount of the binder in the vicinity of the current collector 10, and the electrode 30 is obtained that is provided with the compound material layer 20 having favorable adhesion (adhesive strength) with the current collector 10.

In addition, according to the present embodiment, since the polymer protrusions 64 are formed on the surface of the current collector 10, and the binder solution layer 56 and the compound material paste layer 46 are sequentially deposited thereon, the compound material paste layer 46 catches on the polymer protrusions 64. As a result, slippage of the compound material paste layer 46 is prevented, and the electrode 30 is obtained provided with the compound material layer 20 that has favorable flatness and few surface irregularities on the surface thereof. Moreover, according to the present embodiment, since the polymer protrusions 64 function as a binder, adhesion between the compound material layer 20 and the current collector 10 can be further enhanced.

In a preferable technology disclosed herein, the binder solution 50 is composed such that it is able to maintain a state in which it is separated from the compound material paste 40 over at least a fixed period of time. More specifically, as shown in FIG. 4, a state (liquid phase bilayer state) in which a liquid phase in the form of two layers consisting of the binder solution layer 56 and the compound material paste layer 46 is deposited can be formed at least from the time the compound material paste 40 is coated onto the binder solution layer 56 until the time it is dried (for roughly 0.1 seconds or more, and for example, 1 to about 90 seconds or more, and normally for about 2 to 10 seconds or more). The configuration of the drying oven, drying conditions (temperature, time, air flow rate and the like), electrode body transport speed and the like are adjusted so that the compound material paste layer 46 becomes at least generally dry (for example, to an extent to which 50% by volume of the solvent has been volatilized and removed) during the time during which this separation is possible, namely during the time the two phases of the binder solution layer 56 and the compound material paste layer 46 are in a separated state (and typically, separated into two layers). As a result, since mixing of the binder solution layer 56 and the compound material paste layer 46 is inhibited at least during the time from the coating of the compound material paste 40 onto the binder solution layer 56 to the time it is dried, the first binder 54 can be suitably confined to the vicinity of the current collector 10.

Formation of the above-mentioned liquid phase bilayer state can be realized by, for example, making at least one of the binder solution and the compound material paste to have a high viscosity. For example, the viscosity of at least one of the binder solution and the compound material paste is adjusted to 1000 mPa·s or more (B type viscometer rotor, 20 rpm, 20° C.). As a result, mixing of the binder solution layer and compound material paste layer can be suitably inhibited. The higher viscosity as described above is suitably about 1000 mPa·s or more, is normally preferably 2000 mPa·s or more, and for example, is more preferably 3000 mPa·s or more. Although there are no particular limitations on the upper limit of the higher viscosity, it is generally about 20000 mPa·s, and normally preferably 10000 mPa·s or less (for example, 8000 mPa·s or less).

In addition, the viscosity (higher viscosity) of one of the binder solution and compound material paste may be adjusted to 2000 mPa·s or more (and preferably 3000 mPa·s or more), while the viscosity of the other (lower viscosity) may be adjusted to 1000 mPa·s or less (and preferably 500 mPa·s or less (for example about 80 to 500 mPa·s, or for example, about 300 to 500 mPa·s). As a result of providing such a difference in viscosity, the above-mentioned mixing can be more suitably inhibited. From the viewpoint of inhibiting mixing, the difference in viscosity between the binder solution and the compound material paste is suitably about 1000 mPa·s or more, normally preferably 2000 mPa·s or more, and for example, more preferably 2500 mPa·s or more (for example, within the range of roughly 2500 to 8000 mPa·s, for example, preferably 2600 mPa·s or more, and more preferably 2900 mPa·s or more). In a preferable aspect disclosed herein, the compound material paste has the higher viscosity while the binder solution has the lower viscosity.

The viscosities of the binder solution and the compound material paste can be adjusted by, for example, suitably adjusting the solid content in the liquid. For example, the viscosity of the compound material paste can be adjusted by suitably adjusting the solid concentrations of active material, binder and other components forming the compound material layer (such as electrically conductive materials) in the compound material paste. In addition, the viscosity of the binder solution can be adjusted by suitably adjusting the binder concentration in the binder solution. Alternatively, the above viscosities may also be adjusted to be within the preferable ranges by adding a thickener (and typically, a polymer material). Incidentally, the same solvent (such as a common aqueous solvent) can be used for the compound material paste and the binder solution.

An example of another method for realizing the above-mentioned liquid phase bilayer state (inhibition of mixing) is a method that imparts a difference in SP values. Preferably, the difference in SP values between the binder solution and the compound material paste is adjusted to be 2.0 or more. The above-mentioned mixing can be suitably inhibited by imparting a difference in SP values in this manner. Generally, the difference in SP values is suitably 2 or more, normally preferably 2 to 25, and more preferably, for example, 5 to 20.

A difference in SP values within the above-mentioned ranges can be realized by suitably selecting the solvent of the compound material paste and the solvent of the binder solution. For example, in the case the solvent of the compound material paste is water (SP value: 23.4) or N-methylpyrrolidone (SP value: 11.3), then carbon tetrachloride (SP value: 8.6) or a fluorine-based liquid can be preferably used for the solvent of the binder solution. Alternatively, even in the case of using the same solvent for the solvent of the compound material paste and the solvent of the binder solution, a difference in SP values that is within the above-mentioned ranges can be realized by suitably selecting other material components that compose the compound paste and the binder solution (active material, binder and other components that form the compound material layer).

An example of another method for realizing the above-mentioned liquid phase bilayer state (inhibition of mixing) is a method that imparts a difference in specific gravity. Preferably, the specific gravities are adjusted such that the specific gravity of the binder solution is higher than the specific gravity of the compound material paste. As a result of imparting a difference in specific gravities in this manner, the above-mentioned mixing can be suitably inhibited. Methods for realizing the liquid phase bilayer state as described above can each be used alone or can be used in combination.

Figure 7:
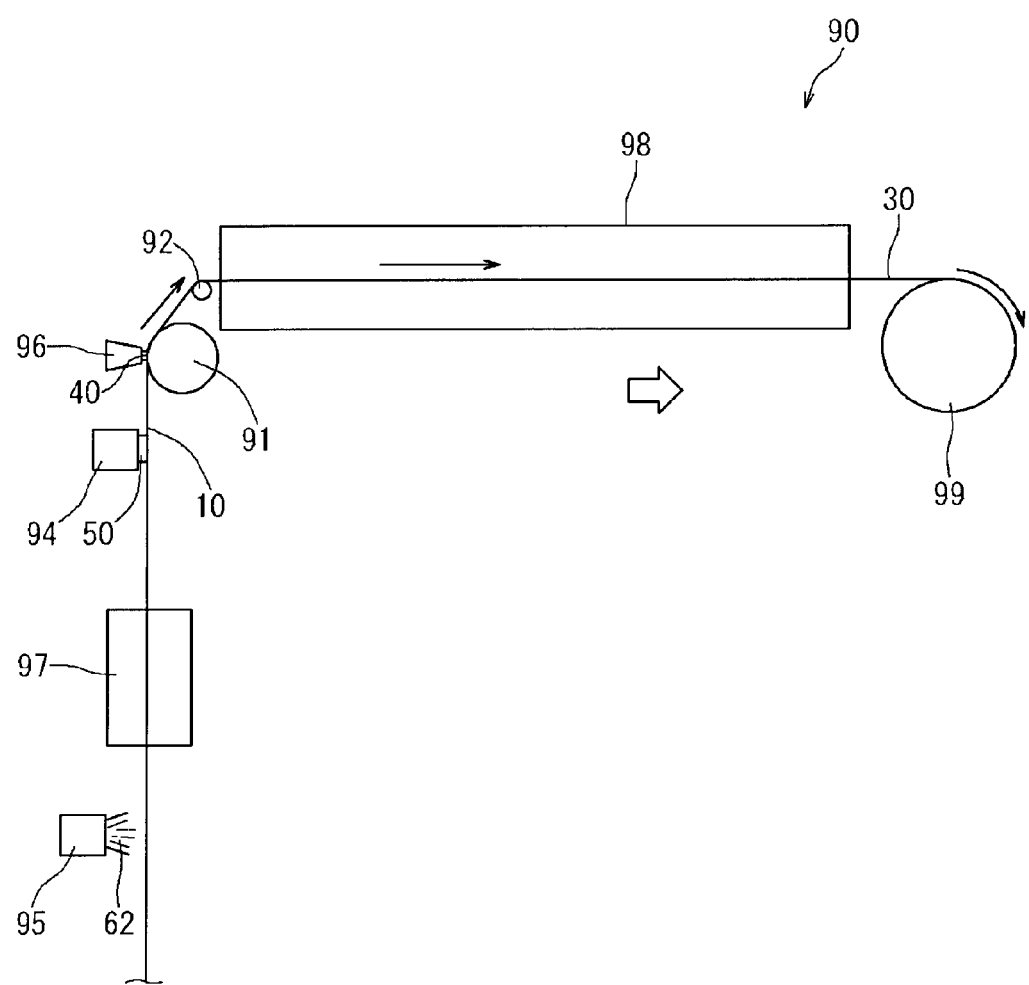
FIG. 7 is cross-sectional view schematically showing the production apparatus of an electrode relating to an embodiment of the present invention.

Next, an explanation is provided of a production apparatus 90 used to produce the electrode 30 while additionally referring to FIG. 7. The long sheet-like current collector 10 is unwound from an unwinding unit not shown, and transported through the apparatus 90 by rotation of rollers 91 and 92. A spraying apparatus 95, a drying oven 97, a dispenser apparatus 94, a die coater 96 and a drying oven 98 are arranged in the transport path of the current collector 10 in order from the upstream side.

The polymer solution 60 is housed in the spraying apparatus 95, and the polymer solution 60 is sprayed onto the surface of the current collector 10 during transport. Subsequently, by allowing the current collector 10 to pass through the drying oven 97 and drying the polymer solution 60, dot-like polymer protrusions are formed on the current collector.

The binder solution 50 is housed in the dispenser apparatus 94, and the binder solution 50 is coated in the form of bands onto the polymer protrusions on the current collector 10 during transport. In addition, the compound material paste 40 is housed in the die coater 96, and the compound material paste 40 is coated in the form of bands onto the current collector 10 during transport (and over the binder solution layer). Subsequently, the current collector 10 is passed through the drying oven 98 to dry the binder solution and the compound material paste and obtain the negative electrode sheet 30 in which the compound material layer 20 is formed on the current collector. The negative electrode sheet 30 is then supplied to the next step after being taken up by a take-up unit 99.

Next, the following experiment was carried out as an example to confirm that the flatness of the surface (coated surface) of the compound material layer can be made to be favorable by applying the method of the present embodiment.

First, in this example, styrene butadiene rubber (SBR) used for the polymer material 66 was dispersed in water to prepare the polymer solution 60 (solid concentration: 12% by weight) followed by coating this onto the surface of a long sheet-like copper foil (current collector) 10 with a spray gun (Nordson) to obtain the copper foil 10 in which the dot-like polymer protrusions 64 were provided on the surface thereof. Coating of the polymer solution was carried out by moving the discharge port of the spray gun at a speed of 60 m/min at a distance of 200 mm from the surface of the current collector (copper foil) and spraying a fixed amount of the polymer solution at 100 g/min from the discharge port.

In addition, styrene butadiene rubber (SBR) used for the binder 54 was dispersed in water to prepare the binder solution 50 (solid concentration: 10%) having a viscosity of 80 mPa·s. In addition, carbon powder used for the negative electrode active material 22 and carboxymethyl cellulose (CMC) used as a thickener were dispersed in water so that the weight ratio of these materials was 99:1 to prepare a compound material paste having a viscosity of 3000 mPa·s. The binder solution was then coated onto the current collector (copper foil) over the polymer protrusions 64 to deposit the binder solution layer 56, and the compound material paste 40 was coated over the binder solution layer 56 to deposit the compound material paste layer 46. This was then dried at roughly 80° C. to obtain the negative electrode 30 in which the compound material layer 20 was provided on the current collector (copper foil) 10. Furthermore, the viscosities of the binder solution and the compound material paste were measured using a B type viscometer by adjusting the temperature to 20° C. and rotating the rotor at 20 rpm.

In addition, a negative electrode sheet was produced without forming the polymer protrusions 64 on the surface of the current collector (copper foil) for the sake of comparison. The negative electrode sheet was obtained in the same manner as the example with the exception of not forming the polymer protrusions 64.

In addition, a negative electrode sheet (ordinary electrode) was produced using the same method as in the prior art (without coating the binder solution onto the copper foil) as a reference example. More specifically, carbon powder used as a negative electrode active material, SBR used as a binder and CMC used as a thickener were dispersed in water so that the weight ratio of these materials was 98:1:1 to prepare a compound material paste followed by coating the compound material paste onto a current collector (copper foil) and drying to obtain a negative electrode sheet in which a negative electrode compound material layer was provided on the surface of the current collector.

The surface status (film thickness profile) of the compound material layer relating to each example obtained in the manner described above was measured and evaluated. Measurement of the surface status (film thickness profile) of the compound material layer was carried out using a laser displacement sensor manufactured by Lasertec Corp. Those results are shown in FIG. 8.

Figure 8:
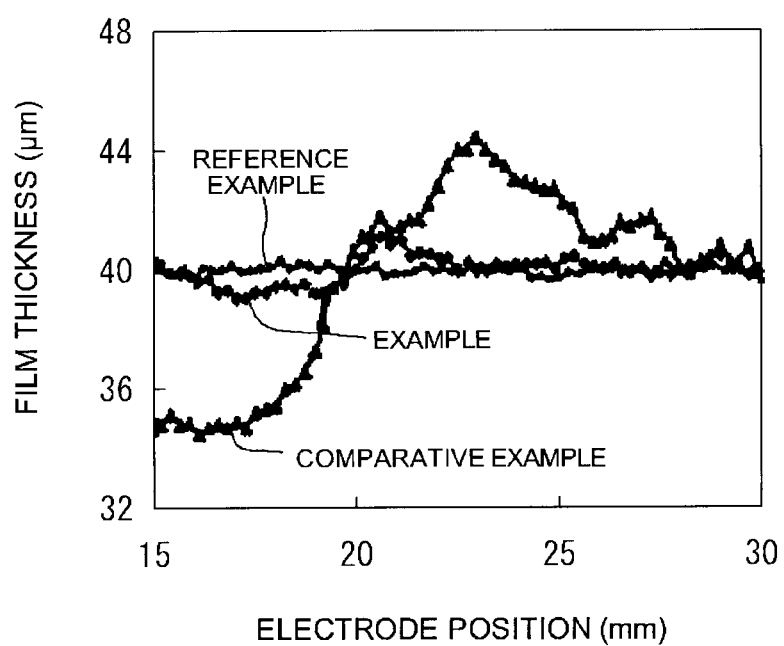
FIG. 8 is a drawing showing film thickness profiles of compound material layers relating to an example and comparative example.

As is clear from FIG. 8, in a negative electrode sheet relating to a comparative example in which the polymer protrusions 64 were not formed on the surface of the current collector (copper foil), surface irregularities on the surface of the compound material layer were larger than those of a reference example (ordinary electrode). In contrast, in a negative electrode sheet relating to an example in which the polymer protrusions 64 were formed on the surface of the current collector (copper foil), surface irregularities on the surface of the compound material layer were smaller than those of the comparative example, and flatness of the surface of the compound material layer was clearly improved. On the basis thereof, formation of the polymer protrusions 64 on the surface of the current collector was confirmed to result in favorable flatness of the surface of the compound material layer.

Figure 9:
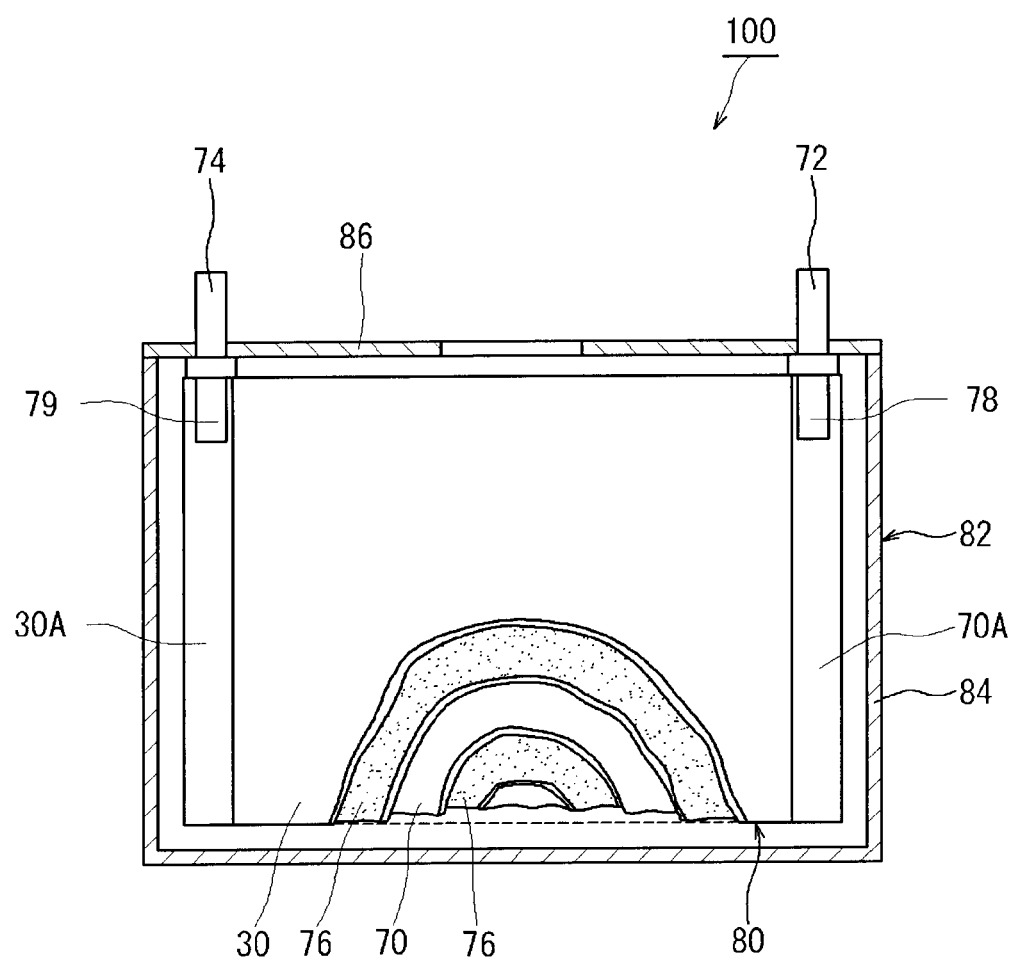
FIG. 9 is a drawing schematically showing an electrode relating to an embodiment of the present invention.

The following provides an explanation of an embodiment of a lithium secondary battery constructed by using the negative electrode (negative electrode sheet) 30 produced by applying the method described above while referring to the schematic drawing shown in FIG. 9. In this lithium secondary battery 100, a negative electrode (negative electrode sheet) 30 produced using a current collector in which polymer protrusions are formed on the surface thereof is used for the negative electrode (negative electrode sheet) 30. Furthermore, the electrode production method disclosed here can also be applied to the production of a positive electrode or negative electrode.

As shown in the drawing, the lithium secondary battery 100 relating to the present embodiment is provided with a case 82 made of metal (and preferably also made of a resin or laminated film). This case (outer container) 82 is provided with a case body 84 in the form of a flat rectangular solid having an open upper end, and a cover 86 that covers the opening. A positive electrode terminal 72, which is electrically connected to a positive electrode 70 of an electrode body 80, and a negative electrode terminal 74, which is electrically connected to the negative electrode 30 of the electrode body, are provided in the top of the case 82 (namely, in the cover 86). For example, the long sheet-like positive electrode (positive electrode sheet) 70 and the long sheet-like negative electrode (negative electrode sheet) 30 are laminated and wound together with a total of two long sheet-like separators (separator sheet) 76, after which the flat, wound electrode body 80, produced by collapsing the resulting wound body by pushing from the lateral direction, is housed within the case 82.

The negative electrode sheet 30 has a configuration in which the negative electrode compound material layer 20 consisting mainly of the negative electrode active material is provided on both sides of the long sheet-like negative electrode current collector 10. In addition, the positive electrode sheet 70 has a configuration in which the positive electrode compound material layer composed mainly of the positive electrode active material is provided on both sides of the long sheet-like positive electrode current collector in the same manner as the negative electrode sheet. A portion at which an electrode compound material layer is not formed, where the above-mentioned electrode compound material layer is not provided, is formed on either side of one end in the direction of width of the electrode sheets 30 and 70.

During the lamination described above, the positive electrode sheet 70 and the negative electrode sheet 30 are superimposed while shifting in the direction of width so that the portion of the positive electrode sheet 70 where the positive electrode compound material layer is not formed and the portion of the negative electrode sheet 30 where the negative electrode compound material layer is not formed respectively protrude from both sides of the separator sheets 76 in the direction of width. As a result, the portions of the positive electrode sheet 70 and the negative electrode sheet 30 where the electrode compound material layers are not formed respectively protrude to the outside from a winding core portion (namely, the portion where the portions of the positive electrode sheet 70, the negative electrode sheet 30 where the electrode compound material layers, and the two separator sheets 76 are not formed are tightly wound) in the horizontal direction relative to the direction of winding of the wound electrode body 80. A positive electrode lead terminal 78 and a negative electrode lead terminal 79 are respectively provided on the positive electrode side protruding portion (namely, the portion where the positive electrode compound material layer is not formed) 70A and the negative electrode side protruding portion (namely, the portion where the negative electrode compound material layer is not formed) 30A, and are electrically connected to the above-mentioned positive electrode terminal 72 and the negative electrode terminal 74, respectively.

Furthermore, constituent elements that compose the wound electrode body 80 other than the negative electrode sheet 30 may be same as those of an electrode body of a conventional lithium secondary battery and there are no particular limitations thereon. For example, the positive electrode sheet 70 can be formed by applying a positive electrode compound material layer consisting mainly of a lithium secondary battery positive electrode active material onto a long positive electrode current collector. Aluminum foil or other metal foil suitable for a positive electrode is preferably used for the positive electrode current collector. One type or two or more types of materials conventionally used in lithium secondary batteries can be used without any particular limitations for the positive electrode active material. Preferable examples include those composed mainly of a lithium transition metal composite oxide containing as constituent metal elements lithium and one type or two or more types of transition metal elements, such as $LiMn_2O_4$, $LiCoO_2$ or $LiNiO_2$.

In addition, a preferable example of the separator sheets 76 used between the positive and negative electrode sheets 70 and 30 is that composed of a porous polyolefin-based resin. Furthermore, the separator may not be required in the case of using a solid electrolyte or gelled electrolyte for the electrolyte (namely, the electrolyte per se can function as a separator in such cases).

The wound electrode body 80 is housed in the case body 84 through the opening in the upper end of the case body 84, and an electrolyte solution containing a suitable electrolyte is arranged (filled) in the case body 84. The electrolyte is, for example, a lithium salt such as $LiPF_6$. For example, a non-aqueous electrolyte solution can be used that is obtained by dissolving a suitable amount (such as a concentration of 1 M) of a lithium salt such as $LiPF_6$ in a mixed solvent (having a weight ratio of, for example, 1:1) of diethyl carbonate and ethylene carbonate.

Subsequently, the opening is sealed by welding to the cover 86, for example, to complete assembly of the lithium secondary battery 100 relating to the present embodiment. The sealing process of the case 82 and the arrangement (filling) process of the electrolyte may be the same as techniques carried out in the production of conventional lithium secondary batteries, and are not intended to characterize the present invention. Construction of the lithium secondary battery 100 relating to the present embodiment is completed in this manner.

Since the lithium secondary battery 100 constructed in the manner described above is constructed using an electrode produced by using a current collector in which slippage-preventing protrusions are formed on the surface thereof as previously described for at least one of the electrodes, it demonstrates superior battery performance. For example, by constructing a battery using the above-mentioned electrode, the lithium secondary battery 100 can be provided that satisfies at least one (and preferably both) of high cycle durability and favorable productivity.

Although the present invention has been explained using a preferable embodiment thereof, the description thereof is not intended to be limiting, but rather various modifications can naturally be made.

Figure 10A:
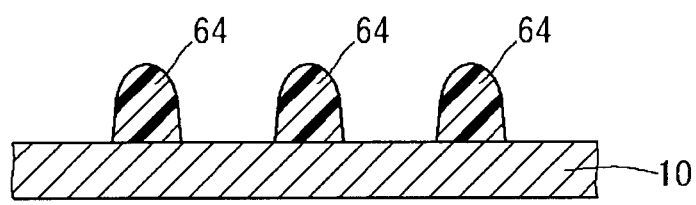
FIG. 10A is cross-sectional view schematically showing the production process of an electrode relating to an embodiment of the present invention.
Figure 10B:
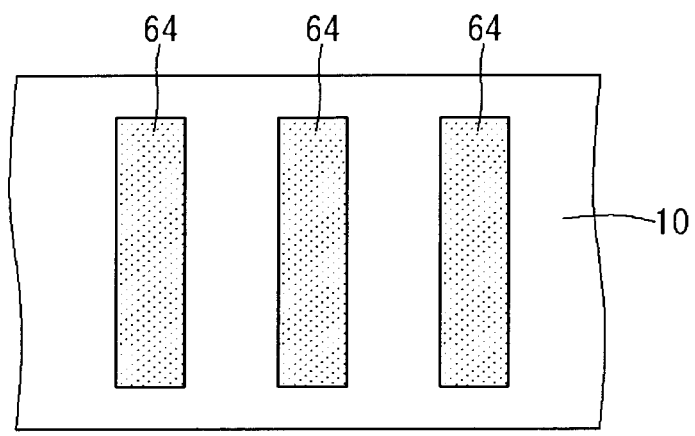
FIG. 10B is an overhead view schematically showing the production process of an electrode relating to an embodiment of the present invention.

For example, although examples were indicated in the above-mentioned embodiment of the case of forming dot-like polymer protrusions, the shape of the polymer protrusions is not limited to dots. For example, as shown in FIGS. 10A and 10B (overhead view), the polymer protrusions 64 can also be formed into the shape of patterned projections. In this case as well, slippage of the compound material layer can be suitably inhibited by the protrusions 64 in the form of patterned surface irregularities. These polymer protrusions 64 can be formed by, for example, pattern-printing a polymer solution containing polymer onto a current collector followed by drying.

INDUSTRIAL APPLICABILITY

According to the present invention, a method can be provided for producing a battery electrode provided with a compound material layer having favorable adhesion with a current collector and a surface having favorable flatness.

Figure 11:
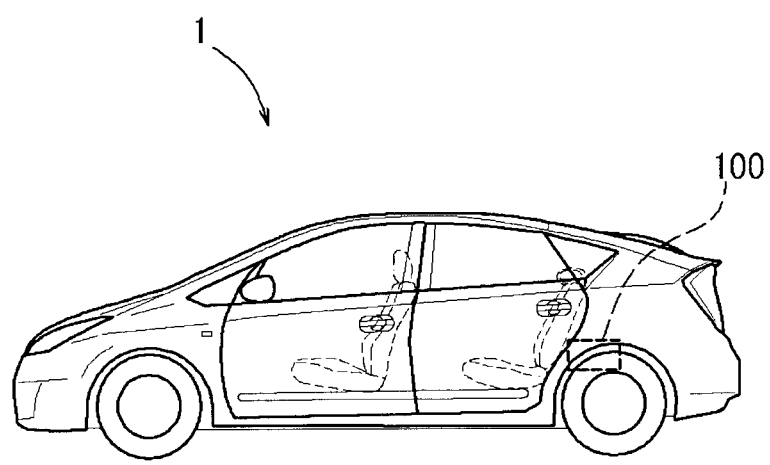
FIG. 11 is a side view of a vehicle installed with a battery relating to an embodiment of the present invention.

Since the battery (such as a lithium secondary battery) relating to the present invention has superior battery performance as previously described, it can be used particularly preferably as a power supply for a motor installed in a vehicle such as an automobile. Thus, as schematically shown in FIG. 11, the present invention provides a vehicle (typically an automobile, and particularly an automobile equipped with a motor in the manner of a hybrid vehicle, electric vehicle or fuel cell vehicle) 1 that is equipped with this battery (which can also be in the form of a battery assembly) 100 as the power supply thereof.

The invention claimed is:

1. A method for producing a battery electrode having a configuration in which a compound material layer containing an active material and a binder is retained on a current collector, comprising:
   forming protrusions composed of a polymer on a surface of the current collector;
   forming a first layer of a binder solution in a liquid phase, comprising a binder and a solvent, over the polymer protrusions on the current collector, wherein the first layer of the binder solution is formed such that a distal end of the polymer protrusions protrudes above an upper surface of the first layer of the binder solution and a proximal end of the polymer protrusions contacts the current collector;
   depositing a liquid phase bilayer consisting of the first layer of the binder solution and a second layer of a compound material paste comprising the active material and a solvent on the current collector by applying the compound material paste over the first layer of the binder solution; and
   drying the liquid phase bilayer.

2. The production method according to claim 1, wherein the height of the polymer protrusions is larger than the thickness of the binder solution layer.

3. A method for producing a battery electrode having a configuration in which a compound material layer containing an active material and a binder is retained on a current collector, comprising
   forming protrusions composed of a polymer on a surface of the current collector;
   forming a binder solution layer by coating a binder solution containing the binder over the polymer protrusions onto the current collector;
   depositing the binder solution layer and a compound material paste layer on the current collector by coating a compound material paste containing the active material over the binder solution layer; and
   obtaining an electrode in which the compound material layer is formed on the current collector by drying both the deposited binder solution layer and the compound material past layer,
   wherein the height of the polymer protrusions is larger than a total combined thickness of the thickness of the binder solution layer and the thickness of the compound material paste layer.

4. The production method according to claim 1, wherein the polymer protrusions are formed in the form of dots.

5. The production method according to claim 1, wherein the polymer protrusions are formed in the form of patterned projections.

6. The production method according to claim 1, wherein the polymer protrusions are formed by coating a polymer solution containing the polymer onto the current collector followed by drying.

7. The production method according to claim 6, wherein coating of the polymer solution is carried out by spraying.

8. The production method according to claim 6, wherein static electricity is applied to a coating of the polymer solution.

9. The production method according to claim 1, wherein the polymer protrusions function as a binder in the compound material layer.

10. The production method according to claim 1, wherein the polymer protrusions are made of the same material as the binder contained in the binder solution.

* * * * *